(12) United States Patent
Stockbridge et al.

(10) Patent No.: US 11,831,137 B2
(45) Date of Patent: Nov. 28, 2023

(54) ARC FAULT DETECTION IN TRANSPORT REFRIGERATION UNIT

(71) Applicant: Carrier Corporation, Palm Beach Gardens, FL (US)

(72) Inventors: Michael Stockbridge, Canastota, NY (US); William F. Caswell, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 481 days.

(21) Appl. No.: 16/972,159

(22) PCT Filed: Aug. 5, 2019

(86) PCT No.: PCT/US2019/045082
§ 371 (c)(1),
(2) Date: Dec. 4, 2020

(87) PCT Pub. No.: WO2020/033297
PCT Pub. Date: Feb. 13, 2020

(65) Prior Publication Data
US 2021/0242676 A1 Aug. 5, 2021

Related U.S. Application Data

(60) Provisional application No. 62/716,049, filed on Aug. 8, 2018.

(51) Int. Cl.
*H02H 1/00* (2006.01)
*F25D 11/00* (2006.01)
*F25D 29/00* (2006.01)

(52) U.S. Cl.
CPC ......... *H02H 1/0015* (2013.01); *F25D 11/003* (2013.01); *F25D 29/003* (2013.01)

(58) Field of Classification Search
CPC . B60H 1/00428; B60H 1/3232; F25D 11/003; F25D 29/003; H02H 1/0015; Y02T 10/88
(Continued)

(56) References Cited

U.S. PATENT DOCUMENTS 5,485,093 A * 1/1996 Russell ................. G01R 31/58
702/58
5,729,145 A 3/1998 Blades
(Continued)

FOREIGN PATENT DOCUMENTS

CN 202676813 U 1/2013
CN 107314610 A * 11/2017
(Continued)

OTHER PUBLICATIONS

Machine translation of He et al. Chinese Patent Document CN 107314610 A Nov. 3, 2017 (Year: 2017).*
(Continued)

*Primary Examiner* — Kevin J Comber
(74) *Attorney, Agent, or Firm* — CANTOR COLBURN LLP

(57) ABSTRACT

A cargo (22) detection system for a refrigerated cargo container (10) includes a cargo sensor (50) body configured to detect presence of cargo (22) in a refrigerated cargo container (10) and a sensor bracket (56) configured for securing the cargo sensor (50) body at a refrigeration unit (24) of the refrigerated cargo container (10). A temperature sensor (72) is located at the cargo sensor (50) body and is configured to detect a temperature of the cargo sensor (50) body. A temperature controller (74) is operably connected to the temperature sensor (72) and is configured to activate the cargo sensor (50) body for collection of data when the temperature of the cargo sensor (50) body is above a threshold.

16 Claims, 4 Drawing Sheets

(58) Field of Classification Search
USPC .......................................................... 361/2
See application file for complete search history.

(56) References Cited

U.S. PATENT DOCUMENTS

| | | | |
|---|---|---|---|
| 5,835,319 | A | 11/1998 | Welles, II et al. |
| 6,242,922 | B1 | 6/2001 | Daum et al. |
| 6,639,769 | B2 | 10/2003 | Neiger et al. |
| 7,307,820 | B2 | 12/2007 | Henson et al. |
| 7,463,037 | B2 | 12/2008 | Henson et al. |
| 8,879,218 | B2 | 11/2014 | Tomimbang |
| 8,929,036 | B2 | 1/2015 | Nayak et al. |
| 9,337,643 | B2 | 5/2016 | Kim |
| 9,513,320 | B2 | 12/2016 | Whisenand et al. |
| 9,627,881 | B2 | 4/2017 | Schweitzer, III et al. |
| 9,638,738 | B2 | 5/2017 | Shea |
| 9,948,087 | B2 | 4/2018 | Haines et al. |
| 2018/0048143 | A1* | 2/2018 | Okerman ............. H02H 1/0015 |
| 2018/0328643 | A1* | 11/2018 | Eddy ................... F25D 19/003 |

FOREIGN PATENT DOCUMENTS

| | | | | |
|---|---|---|---|---|
| CN | 107314610 A | 11/2017 | | |
| KR | 1584980 B1 | * 1/2016 | .......... | H01M 10/465 |
| KR | 101584980 B1 | 1/2016 | | |
| WO | 2016054632 A1 | 4/2016 | | |
| WO | 2017083334 A1 | 5/2017 | | |

OTHER PUBLICATIONS

Machine translation of Kim et al. Korean Patent Document KR 101584980 B1 Jan. 14, 2016 (Year: 2016).*
International Search Report for International Application No. PCT/US2019/045082, International Filing Date Aug. 5, 2019, dated Oct. 16, 2019, 6 pages.
Written Opinion for International Application No. PCT/US2019/045082, International Filing Date Aug. 5, 2019, dated Oct. 16, 2019, 8 pages.

* cited by examiner

ARC FAULT DETECTION IN TRANSPORT REFRIGERATION UNIT

CROSS REFERENCE TO RELATED APPLICATIONS

This is a U.S. National Stage of Application No. PCT/US2019/045082, filed Aug. 5, 2019, which claims priority to U.S. Provisional Application No. 62/716,049, filed Aug. 8, 2018, the disclosures of which are incorporated herein by reference in their entireties.

BACKGROUND

This disclosure relates generally to transport refrigeration units, and more particularly to detecting an electrical arc fault in a transport refrigeration unit.

Trailers may be equipped with a transport refrigeration unit to condition the environment within the cargo compartment. The transport refrigeration unit may include several electrically powered components. The transport refrigeration unit may experience electrical arc faults.

BRIEF DESCRIPTION

According to one embodiment, a method for detecting an electrical arc fault in a transport refrigeration unit includes monitoring a parameter of a power source powering the transport refrigeration unit; determining a magnitude of a high frequency component of the parameter of the power source; comparing the high frequency component of the parameter of the power source to a threshold; and determining that the electrical arc fault is present when the high frequency component of the parameter of the power source exceeds the threshold.

In addition to one or more of the features described above or below, or as an alternative, further embodiments could include monitoring a system parameter of the transport refrigeration unit; and setting the threshold in response to the system parameter.

In addition to one or more of the features described above or below, or as an alternative, further embodiments could include wherein the system parameter comprises a DC current; wherein setting the threshold comprises increasing the threshold when a DC current is present.

In addition to one or more of the features described above or below, or as an alternative, further embodiments could include wherein the system parameter comprises active AC loads; wherein setting the threshold comprises increasing the threshold when an active AC load is present.

In addition to one or more of the features described above or below, or as an alternative, further embodiments could include wherein the system parameter comprises type of power source; wherein setting the threshold comprises increasing the threshold when the type of power source indicates a likelihood of high frequency components.

In addition to one or more of the features described above or below, or as an alternative, further embodiments could include wherein increasing the threshold comprises increasing a reference threshold by a predetermined first amount.

In addition to one or more of the features described above or below, or as an alternative, further embodiments could include determining if a load on the power source has changed within a time frame; wherein when the load on the power source has changed within the time frame, then terminating the detecting of the electrical arc fault.

In addition to one or more of the features described above or below, or as an alternative, further embodiments could include wherein the threshold comprises a magnitude component.

In addition to one or more of the features described above or below, or as an alternative, further embodiments could include wherein the threshold comprises a magnitude component and a time component.

According to another embodiment, a transport refrigeration unit includes a power source; a compressor, a condenser fan motor and an evaporator fan motor, at least one of the compressor, the condenser fan motor and the evaporator fan motor powered by the power source; a sensor to monitor a parameter of the power source; a controller in communication with the sensor, the controller configured to execute operations comprising: monitoring a parameter the power source powering the transport refrigeration unit; determining a magnitude of a high frequency component of the parameter of the power source; comparing the high frequency component of the parameter of the power source to a threshold; and determining that the electrical arc fault is present when the high frequency component of the parameter of the power source exceeds the threshold.

In addition to one or more of the features described above or below, or as an alternative, further embodiments of the transport refrigeration unit could include wherein the operations further comprise: monitoring a system parameter of the transport refrigeration unit; and setting the threshold in response to the system parameter.

In addition to one or more of the features described above or below, or as an alternative, further embodiments of the transport refrigeration unit could include wherein the system parameter comprises a DC current; wherein setting the threshold comprises increasing the threshold when a DC current is present.

In addition to one or more of the features described above or below, or as an alternative, further embodiments of the transport refrigeration unit could include wherein the system parameter comprises active AC loads; wherein setting the threshold comprises increasing the threshold when an active AC load is present.

In addition to one or more of the features described above or below, or as an alternative, further embodiments of the transport refrigeration unit could include wherein the system parameter comprises type of power source; wherein setting the threshold comprises increasing the threshold when the type of power source indicates a likelihood of high frequency components.

In addition to one or more of the features described above or below, or as an alternative, further embodiments of the transport refrigeration unit could include wherein increasing the threshold comprises increasing a reference threshold by a predetermined first amount.

In addition to one or more of the features described above or below, or as an alternative, further embodiments of the transport refrigeration unit could include determining if a load on the power source has changed within a time frame; wherein when the load on the power source has changed within the time frame, then terminating the detecting of the electrical arc fault.

In addition to one or more of the features described above or below, or as an alternative, further embodiments of the transport refrigeration unit could include wherein the threshold comprises a magnitude component.

In addition to one or more of the features described above or below, or as an alternative, further embodiments of the transport refrigeration unit could include wherein the threshold comprises a magnitude component and a time component.

Technical effects of embodiments of the present disclosure include the ability to detect an electrical arc fault in a transport refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

Figure 1:
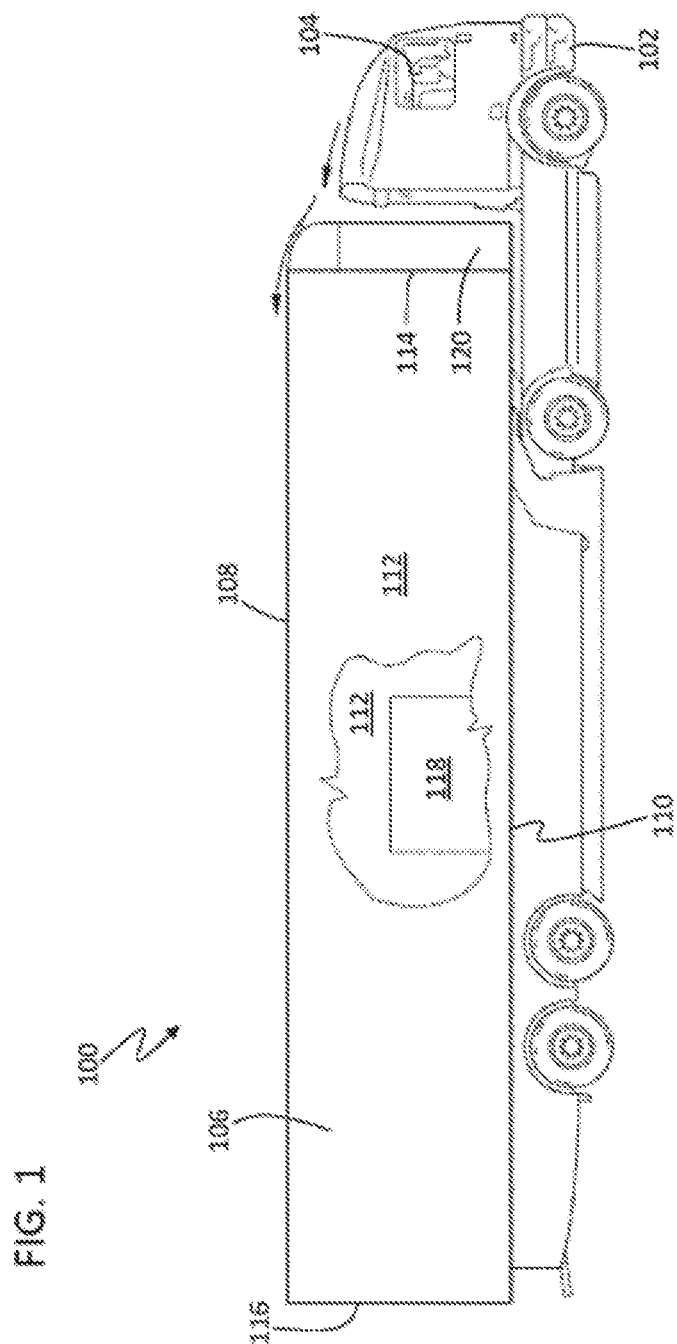
FIG. 1 depicts a tractor trailer system having a transport refrigeration unit and a cargo compartment in an example embodiment.

The detailed description explains embodiments of the invention, together with advantages and features, by way of example with reference to the drawing.

DETAILED DESCRIPTION

Shown in FIG. 1 is an embodiment of a tractor trailer system 100. The tractor trailer system 100 includes a tractor 102 including an operator's compartment or cab 104 and also including an engine, which acts as the drive system of the tractor trailer system 100. A trailer 106 is coupled to the tractor 102. The trailer 106 is a refrigerated trailer 106 and includes a top wall 108, a directly opposed bottom wall 110, opposed side walls 112, and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a transport refrigeration unit 120 located on the trailer 106. The transport refrigeration unit 120, as shown in FIG. 1, is located at or attached to the front wall 114.

Figure 2:
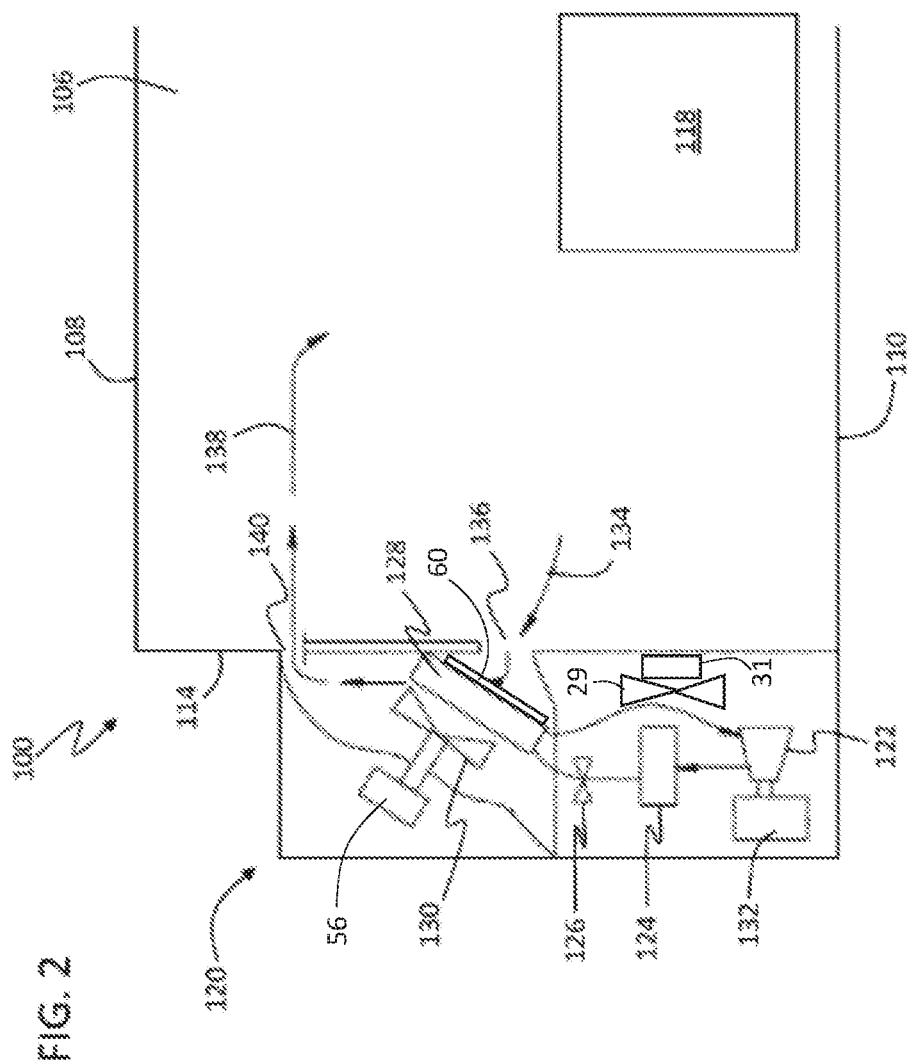
FIG. 2 depicts a transport refrigeration unit for a cargo compartment of the tractor trailer system of FIG. 1 in an example embodiment.

Referring now to FIG. 2, the transport refrigeration unit 120 is shown in more detail. The transport refrigeration unit 120 includes a compressor 122, a condenser 124, a condenser fan 29, a condenser fan motor 31, an expansion valve 126, an evaporator 128, and an evaporator fan 130, evaporator fan motor 56 and heater 60 (shown in FIG. 2), as well as other ancillary components. The compressor 122 is operably connected to an AC power source 132 which drives the compressor 122. The AC power source 132 may include an engine and a generator. The AC power source 132 may be provided by a utility grid, also referred to as shore power.

Airflow is circulated into and through the cargo compartment of the trailer 106 by means of the transport refrigeration unit 120. A return airflow 134 flows into the transport refrigeration unit 120 from the cargo compartment of the trailer 106 through a refrigeration unit inlet 136, and across the evaporator 128 via the evaporator fan 130, thus cooling the return airflow 134. The cooled return airflow 134, now referred to as supply airflow 138, is supplied into the cargo compartment of the trailer 106 through a refrigeration unit outlet 140, which in some embodiments is located near the top wall 108 of the trailer 106. The supply airflow 138 cools the cargo 118 in the cargo compartment of the trailer 106.

Although FIG. 1 depicts a tractor-trailer arraignment, it is understood that embodiments described herein may be used with other cargo compartments, such as those in containers. Thus, embodiments are not limited to tractor-trailer systems.

Figure 3:
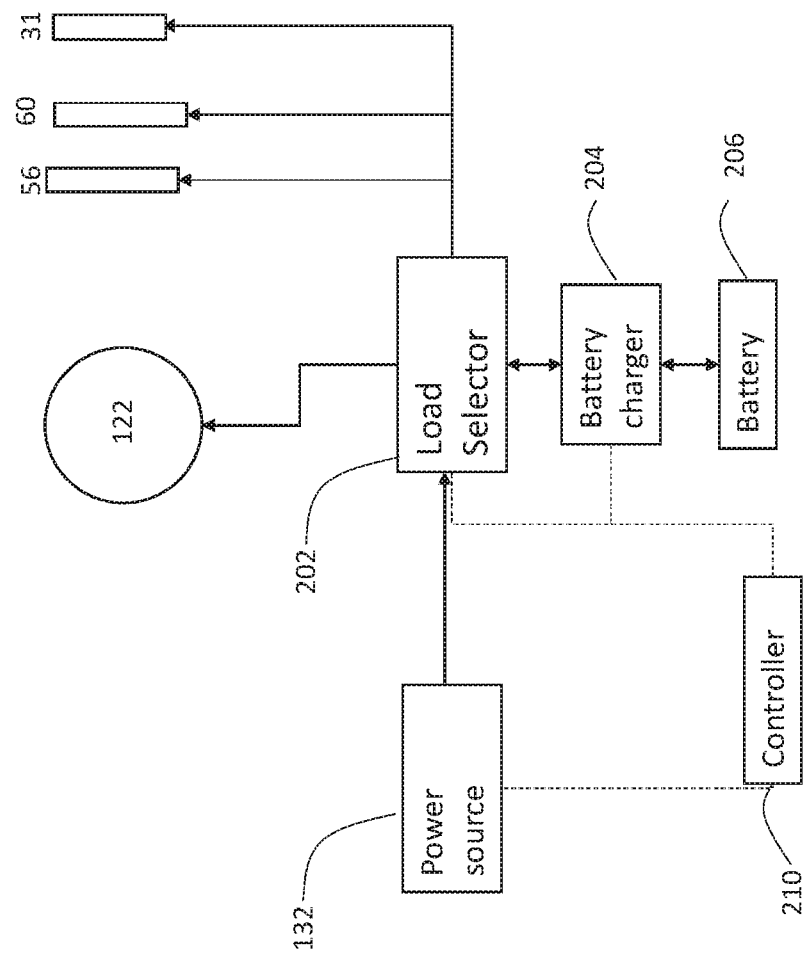
FIG. 3 depicts power distribution in the transport refrigeration unit in an example embodiment.

FIG. 3 depicts power distribution in the transport refrigeration unit 120 in an example embodiment. Several of the components of the transport refrigeration unit 120 are electrically powered, including the compressor 122, the condenser fan motor 31, the evaporator fan motor 56 and the heater 60. A power source 132 may be multiphase (e.g., three phase) AC electrical power from either a generator or from shore power. The multiphase electrical power from the power source 132 is provided to a load selector 202 that is controlled by a controller 210. Other non-linear loads could also be connected to the load selector 202 including a battery charger 204 connected to a battery 206. When power source 132 is present, battery 206 may be charged by battery charger 204. The controller 210 may be in communication with the power source 132, load selector 202, battery charger 204, and other system components, in order to detect electrical arc faults in the transport refrigeration unit 120. The controller 210 may be implemented using a general-purpose microprocessor executing a computer program stored on a storage medium to perform the operations described herein.

Figure 4:
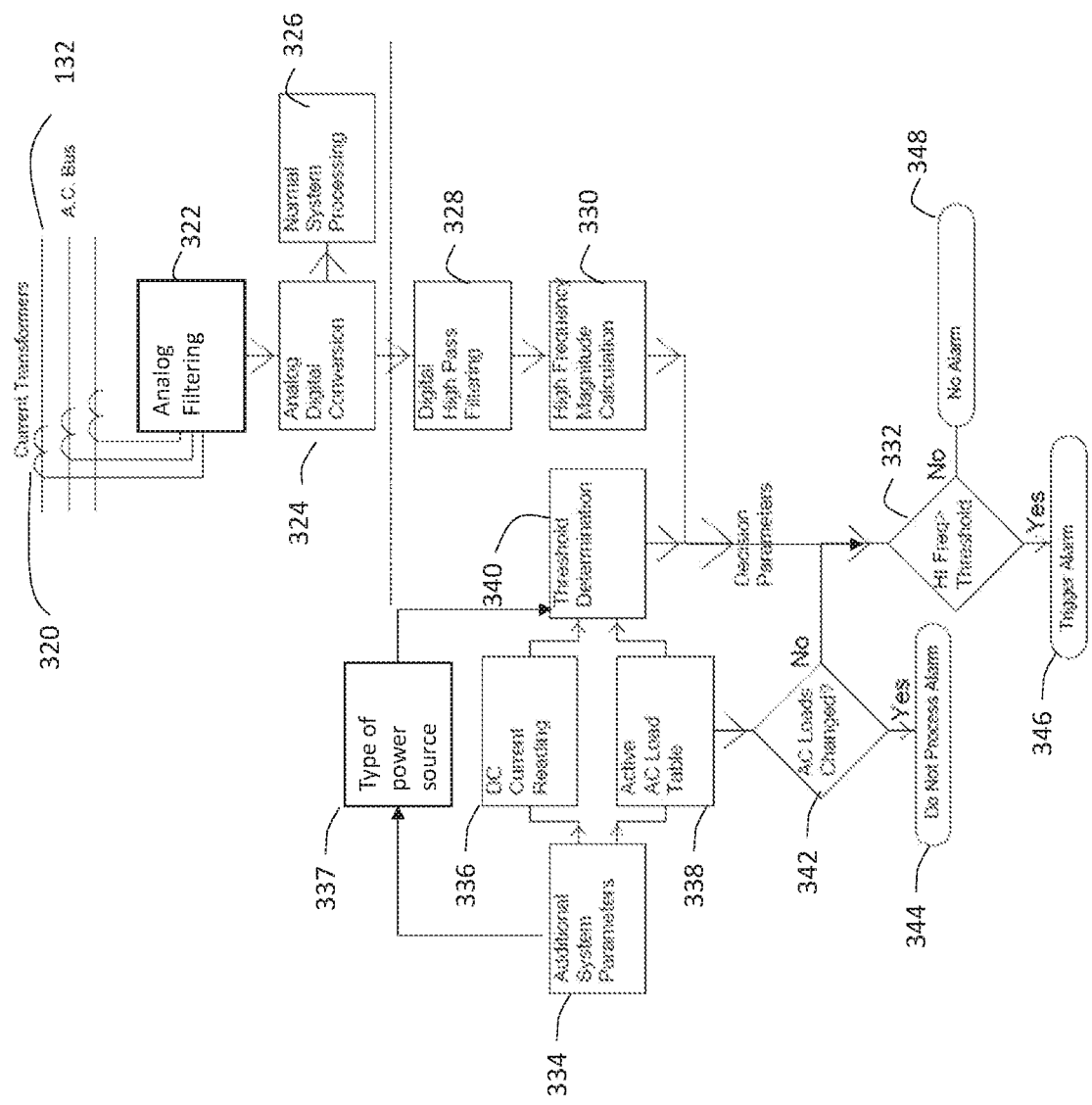
FIG. 4 depicts a process for detecting an electrical arc fault in the transport refrigeration unit in an example embodiment.

FIG. 4 depicts a process for detecting arc faults in the transport refrigeration unit 120 in an example embodiment. The process in FIG. 4 may be implemented by the controller 210. The controller 210 measures an electrical parameter of the power source 132 using sensors 320 (e.g., current sensors, voltage sensors, etc.). The electrical parameter of the power source 132 may be measured over multiple phases, as shown in FIG. 4. The sensed parameter of the power source 132 is passed through an analog filter at 322. The output of the analog filter operation is subjected to an analog-to-digital conversion at 324. At 326, the output of the analog-to-digital conversion at 324 is used by the controller 210 to control operation of the refrigeration unit 120. For example, the controller 210 may alter the speed of the compressor 122 in response to current present on the power source 132.

The output of the analog-to-digital conversion 324 is also provided to a digital high pass filtering operation at 328. At 330, the output of the high pass filtering operation 328 is used to determine a magnitude of a high frequency component of the high pass filtering operation 328. The magnitude of the high frequency component is indicative of the presence of electrical arcing at some location in the transport refrigeration unit 120. The magnitude of the high frequency component is compared to a threshold at 332 to determine if electrical arcing is present.

In order to set a suitable threshold for use at 332, the controller 210 monitors system parameters of the transport refrigeration unit 120 at 334. The controller 210 may alter the threshold in the presence of certain system parameters. A first system parameter monitored at 336 is the presence or absence of DC current being provided to the battery 206 by the battery charger 204. The battery charger 204 can produce high frequency components on the electrical source 132. Thus, if a DC current is being provided to the battery 106 by the battery charger 204, the threshold used at 332 may be increased to prevent a false indication of electrical arcing in the transport refrigeration unit 120. Other non-linear loads may be treated in the same fashion as they get added to the system.

Another system parameter monitored at 338 is the active AC loads in the refrigeration unit 120. The active AC loads may include the compressor 122, condenser fan motor 31, evaporator fan motor 56, etc. Depending on the mode of operation (for example inverter driven loads), these AC loads may produce high frequency components on the electrical source 132. For example, the compressor 122 operating at a certain speed may produce a known harmonic on the power source 132. Thus, when the compressor 122 is operating at a known speed, the threshold used at 332 may be increased to prevent a false indication of electrical arcing.

Another system parameter monitored at 337 is the active type of power source 132. Different types of power sources 132 may be cleaner than others, meaning the power source 132 has less high frequency components. For example, if power source 132 is produced from a diesel driven generator as opposed to the power grid, the power source 132 may be less likely to include high frequency components. This can be used to adjust the threshold used at 332 to determine if electrical arcing is present.

At 340, the controller 210 determines a threshold to use in detecting the presence of electrical arcing in the transport refrigeration unit 120. The controller 210 uses one or more of (i) the information of the presence of system non-linear loads, (ii) the DC current reading from 336, (iii) the active AC loads from 338 and (iv) the type of power source from 337 to set the threshold. In one example, a reference threshold is increased if the DC current reading indicates that the battery charger is actively charging the battery. In this case the reference threshold may be increased by a predetermined first amount (e.g., 5% or 5 milliamps). Alternatively, the reference threshold may be increased by an amount computed from the DC current magnitude. Similarly, the reference threshold may be increased by a second predetermined amount (e.g., 10% or 10 milliamps) when a significant non linear AC load is detected at 338. The reference threshold may be increased by varying amounts depending on the amount of non linear AC load that is active. For example, if the compressor 122 is active, then the threshold is increased by a first amount and if the condenser fan motor 31 is active, the threshold is increased by a second amount. The threshold may be increased if the type of power source at 337 indicates an increased probability of high frequency components (e.g., shore power). Alternatively, the threshold may be decreased if the type of power source at 337 indicates a reduced probability of high frequency components (e.g., diesel driven generator).

At 342, the controller 210 determines if any loads on the power source 132 have changed within a certain time frame (e.g., 10 seconds). For example, if the compressor 122 has turned on in the past ten seconds, then the power source 132 will experience high frequency components due to the compressor 122 being turned on. In such cases, the controller 210 terminates the electrical arc fault detection process at 344 so as to not generate a false indication of an electrical arc fault due to changes in loads on the power source 132.

If the electrical arc fault detection process is not terminated at 344, then at 332, the magnitude of the high frequency component from 330 is compared to the threshold from 340. The threshold may have a magnitude component and an optional time component. For example, the controller 210 may use a threshold of 10 milliamps, derived at 340. If the magnitude of the high frequency component from 330 exceeds 10 milliamps, then flow proceeds to 346 where an electrical arcing alarm is generated by the controller 210. The alarm may be in the form of a signal which initiates a notification (e.g., audible or visual). The alarm may also initiate shut down of the transport refrigeration unit 120. If the threshold includes a time component, then the magnitude of the high frequency component from 330 must exceed the magnitude threshold and the time threshold to generate an alarm. For example, the high frequency component from 330 may need to exceed 10 milliamps for 3 seconds total out of 120 consecutive seconds in order for an alarm response to be triggered. If the threshold is not exceeded at 332, then flow proceeds to 348 where no alarm is generated. The process of FIG. 4 may be repeated in real time to continuously monitor for an electrical arc fault in the transport refrigeration unit 120.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for detecting an electrical arc fault in a transport refrigeration unit, the method comprising:
   monitoring a parameter of a power source powering the transport refrigeration unit;
   determining a magnitude of a high frequency component of the parameter of the power source;
   monitoring a system parameter of the transport refrigeration unit;
   setting a threshold in response to the system parameter;
   comparing the high frequency component of the parameter of the power source to the threshold;
   determining that the electrical arc fault is present when the high frequency component of the parameter of the power source exceeds the threshold.

2. The method of claim 1, wherein:
   the system parameter comprises a DC current;
   wherein setting the threshold comprises increasing the threshold when a DC current is present.

3. The method of claim 2, wherein:
   increasing the threshold comprises increasing a reference threshold by a predetermined first amount.

4. The method of claim 1, wherein:
   the system parameter comprises active AC loads;
   wherein setting the threshold comprises increasing the threshold when an active AC load is present.

5. The method of claim 1, wherein:
   the system parameter comprises type of power source;
   wherein setting the threshold comprises increasing the threshold when the type of power source indicates a likelihood of high frequency components.

6. The method of claim 1, further comprising:
   determining if a load on the power source has changed within a time frame;

wherein when the load on the power source has changed within the time frame, then terminating the detecting of the electrical arc fault.

7. The method of claim 1, wherein:
the threshold comprises a magnitude component.

8. The method of claim 1, wherein:
the threshold comprises a magnitude component and a time component.

9. A transport refrigeration unit comprising:
a power source;
a compressor, a condenser fan motor and an evaporator fan motor, at least one of the compressor, the condenser fan motor and the evaporator fan motor powered by the power source;
a sensor to monitor a parameter of the power source;
a controller in communication with the sensor, the controller configured to execute operations comprising:
   monitoring a parameter the power source powering the transport refrigeration unit;
   determining a magnitude of a high frequency component of the parameter of the power source;
   monitoring a system parameter of the transport refrigeration unit; and
   setting a threshold in response to the system parameter;
   comparing the high frequency component of the parameter of the power source to the threshold; and
   determining that the electrical arc fault is present when the high frequency component of the parameter of the power source exceeds the threshold.

10. The transport refrigeration unit of claim 9, wherein:
the system parameter comprises a DC current;
wherein setting the threshold comprises increasing the threshold when a DC current is present.

11. The transport refrigeration unit of claim 10, wherein:
increasing the threshold comprises increasing a reference threshold by a predetermined first amount.

12. The transport refrigeration unit of claim 9, wherein:
the system parameter comprises active AC loads;
wherein setting the threshold comprises increasing the threshold when an active AC load is present.

13. The transport refrigeration unit of claim 9, wherein:
the system parameter comprises type of power source;
wherein setting the threshold comprises increasing the threshold when the type of power source indicates a likelihood of high frequency components.

14. The transport refrigeration unit of claim 9, further comprising:
determining if a load on the power source has changed within a time frame;
wherein when the load on the power source has changed within the time frame, then terminating the detecting of the electrical arc fault.

15. The transport refrigeration unit of claim 9, wherein:
the threshold comprises a magnitude component.

16. The transport refrigeration unit of claim 9, wherein:
the threshold comprises a magnitude component and a time component.

\* \* \* \* \*